United States Patent
Schmitt

(10) Patent No.: US 8,423,067 B2
(45) Date of Patent: Apr. 16, 2013

(54) METHOD OF CONNECTING PRIORITIZED INCOMING CALLS IN OVERLOAD SITUATIONS IN A MOBILE RADIO NETWORK

(75) Inventor: Harald Schmitt, Bendorf (DE)

(73) Assignee: Deutsche Telekom AG, Bonn (DE)

(*) Notice: Subject to any disclaimer, the term of this patent is extended or adjusted under 35 U.S.C. 154(b) by 289 days.

(21) Appl. No.: 12/741,064

(22) PCT Filed: Oct. 15, 2008

(86) PCT No.: PCT/EP2008/008701
§ 371 (c)(1),
(2), (4) Date: May 24, 2010

(87) PCT Pub. No.: WO2009/074186
PCT Pub. Date: Jun. 18, 2009

(65) Prior Publication Data
US 2010/0267391 A1    Oct. 21, 2010

(30) Foreign Application Priority Data

Dec. 12, 2007  (DE) .................. 10 2007 060 377

(51) Int. Cl.
*H04B 7/00* (2006.01)

(52) U.S. Cl.
USPC ............ 455/512; 455/453; 455/424; 455/411

(58) Field of Classification Search .................. 455/445, 455/404.1–404.2, 509–512, 450–453, 422.1, 455/424, 436; 370/335, 437
See application file for complete search history.

(56) References Cited

U.S. PATENT DOCUMENTS

| | | | |
|---|---|---|---|
| 5,301,356 A | * | 4/1994 | Bodin et al. .................. 455/436 |
| 5,497,504 A | * | 3/1996 | Acampora et al. ............ 455/436 |
| 5,600,704 A | * | 2/1997 | Ahlberg et al. ............... 455/445 |
| 5,706,333 A | * | 1/1998 | Grenning et al. ............. 455/423 |
| 6,058,302 A | * | 5/2000 | Westerberg .................... 455/411 |

(Continued)

OTHER PUBLICATIONS

No Author, "Study of Paging Permission with Access Control" 3d Generation Partnership Project, Dec. 1, 2007 XP002518936, France.

*Primary Examiner* — Sharad Rampuria
(74) *Attorney, Agent, or Firm* — Andrew Wilford

(57) ABSTRACT

The invention relates to a method for connecting a mobile communications connection in a mobile communications network, particularly in a cellular mobile communications network, in the case of temporarily limited accessibility or availability of the mobile communications network due to an overload, between a prioritized first mobile communications terminal device and a non-prioritized second mobile communications terminal device, wherein the non-prioritized mobile communications terminal device is at least partially and at least temporarily blocked due to the overload situation, wherein the first prioritized mobile communications terminal device transmits a call connection attempt, the mobile communications network recognizes the call connection attempt as a prioritized call connection attempt and prioritizes said attempt over other, non-prioritized mobile communications terminal devices and transmits said attempt to the second non-prioritized mobile communications terminal device, wherein the blockage of the second mobile communications terminal device is at least temporarily lifted such that the incoming call may be accepted by the second mobile communications terminal device and the mobile communications connection may be made, the blockage of the second mobile communications terminal device being particularly lifted on the network side or the second mobile communications terminal device particularly having means for recognizing that the call connection attempt is originating from a prioritized mobile communications terminal device and at least temporarily ignoring the blockage thereof.

6 Claims, 1 Drawing Sheet

U.S. PATENT DOCUMENTS

| | | | |
|---|---|---|---|
| 6,366,780 B1 * | 4/2002 | Obhan | 455/453 |
| 6,400,954 B1 * | 6/2002 | Khan et al. | 455/450 |
| 6,484,145 B1 * | 11/2002 | Home et al. | 705/7.25 |
| 6,760,594 B1 * | 7/2004 | Murasawa et al. | 455/512 |
| 7,190,947 B2 * | 3/2007 | Binzel et al. | 455/404.1 |
| 7,623,870 B2 * | 11/2009 | Shyy et al. | 455/453 |
| 7,995,470 B2 * | 8/2011 | Cheng et al. | 370/229 |
| 8,045,973 B2 * | 10/2011 | Chambers | 455/422.1 |
| 8,228,791 B2 * | 7/2012 | Bugenhagen et al. | 370/230 |
| 8,285,253 B2 * | 10/2012 | Leclerc et al. | 455/411 |
| 2004/0029592 A1 * | 2/2004 | Shyy et al. | 455/453 |
| 2007/0238454 A1 * | 10/2007 | Chambers | 455/422.1 |
| 2007/0259668 A1 * | 11/2007 | Legg | 455/450 |
| 2012/0003959 A1 * | 1/2012 | Gonzalez-Canedo et al. | 455/411 |
| 2012/0281530 A1 * | 11/2012 | Sambhwani et al. | 370/230 |

* cited by examiner

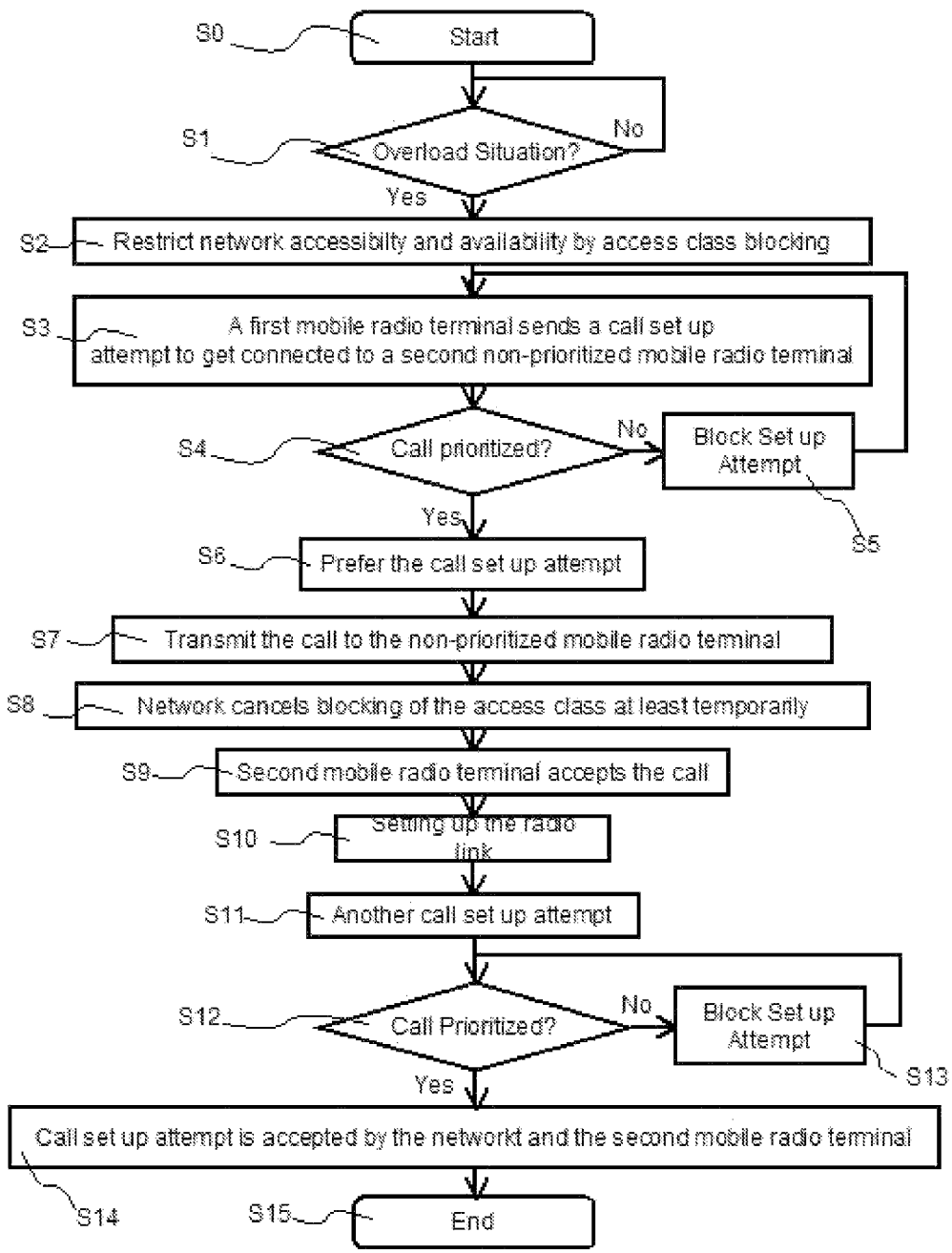

METHOD OF CONNECTING PRIORITIZED INCOMING CALLS IN OVERLOAD SITUATIONS IN A MOBILE RADIO NETWORK

CROSS REFERENCE TO RELATED APPLICATIONS

This application is the US national phase of PCT application PCT/EP2008/008701, filed 15 Oct. 2008, published 18 Jun. 2009 as WO2009/074186, and claiming the priority of German patent application 102007060377.2 itself filed 12 Dec. 2007.

FIELD OF THE INVENTION

The invention relates to a method of setting up a mobile radio link in a mobile radio network, particularly in a cellular mobile radio network, in the case of mobile radio network accessibility or mobile radio network availability which is restricted temporarily because of overload, between a prioritized first mobile radio terminal and a non-prioritized second mobile radio terminal, non-prioritized mobile radio terminals being blocked at least partially and at least temporarily due to the overload situation in which the first, prioritized mobile radio terminal sends a call set up attempt, the mobile radio network recognizes the call set up attempt as prioritized call set up attempt and prefers it compared with call set up attempts of other non-prioritized mobile radio terminals and transmits it to the second, non-prioritized mobile radio terminal.

BACKGROUND OF THE INVENTION

Public cellular mobile radio networks such as GSM (Global System for Mobile Communication) or UMTS (Universal Mobile Telecommunication System) networks have limited communication resources due to the principle involved. In general, these networks are designed in such a manner that the average volume of communication can be granted without restriction. Due to special situations, however, it may occur that a volume of communication requests of above-average level produces a regional or even global capacity utilization of these mobile radio networks. This is the case, for example, with major events or sports events such as world championships or Olympiads or also in catastrophe situations, for example triggered by natural catastrophes. In such situations, the network capacities can be overloaded. The mobile radio networks are therefore set up in such a manner that further call requests are declined when resources are almost or completely used up.

However, it is helpful and in some cases also required, especially in the said situations, that certain mobile radio subscribers such as rescue forces, police, fire departments but also serving members of the mobile radio undertaking operating the mobile radio network obtain secure network access even in the case of networks utilized to capacity. In this context, it must be differentiated that these selected mobile radio subscribers, on the one hand, can convey their access request to the mobile radio network and are not already blocked for an access by the network or rejected and, on the other hand, are assigned the resources necessary for setting up a telecommunication link, for example a free channel.

In GSM and UMTS networks, there is the possibility of prioritizing selected mobile radio terminals, that is to say certain subscribers, compared with other ones. In overload situations in a mobile radio network, prioritized mobile radio terminals or subscribers are treated preferentially compared with non-prioritized mobile radio terminals or subscribers. This enables these subscribers to set up calls even in overload situations. Various methods and standards which have been developed by the 3GPP (Third Generation Partnership Project) are known for technically implementing such prioritizations.

To ward off overload situations in a mobile radio network, a so-called "Access Class Barring" function is used in GSM and UMTS mobile radio networks. It regulates that certain mobile radio terminals are allowed or prohibited from accessing the mobile radio network. In this case, access classes are defined and allocated to the terminals. According to the 3GPP TS 22.011 standard, 16 such access classes are provided. The access class of a subscriber is stored on the SIM (Subscriber Identity Module) or USIM (Universal Subscriber Identity Module) card of the terminal. Classes 0 to 9 are provided for the normal subscribers, classes 11 to 15 are reserved for special subscribers. Thus, for example, class 12 is reserved for security services, class 13 for public supply facilities such as water, power or gas suppliers, class 14 for emergency rescue services such as police and fire departments and classes 11 and 15 for serving members of the mobile radio network operator. The possibility exists that a mobile radio terminal or subscriber has an allocation both to one of classes 0 to 9 and to one of the special classes 11 to 15. Class 10 allows emergency calls and is allocated to each SIM/USIM card. A mobile radio operator is obliged to pay attention when issuing the SIM/USIM cards that the individual access classes 0 to 9 are distributed more or less evenly.

Overload situations are now combated by blocking access classes 0 to 9 on a random basis so that all regular mobile radio subscribers are "disadvantaged" to the same extent when the capacity of the network is overloaded. This means that subscribers with a terminal in which the SIM/USIM card only has allocation to one of classes 0 to 9 are blocked at least temporarily, if necessary, and cannot access the mobile radio network. These terminals cannot therefore set up incoming or outgoing calls.

One possibility for implementing subscriber prioritization is known by the network function "enhanced multi-level precedence and preemption" (eMLPP) and described in specification 3GPP TS 22.067. It guarantees network access even in the case of a blockage, for example due to occupancy of all channels, implements a so-called queue management in which network resources are provided in dependence on priority and regulates the priority of new calls, for example of an emergency call, compared with current calls of lower priority which are displaced by calls of higher priority. In the case of eMLPP, up to seven different priority stages are possible which are defined by eMLPP parameters by means of which a simple allocation of a certain priority stage to the subscribers is possible. The parameters are stored in the home location register (HLR), on the SIM/USIM card of the terminal and/or the mobile switching center (MSC).

However, the eMLPP method does not provide for calls to subscribers which are not allowed to access the network due to the "Access Class Barring". It can only be applied, therefore, if the called subscriber is allowed to communicate with the network. In other words, a subscriber whose terminal is blocked by the "Access Class Barring" cannot communicate with the network even by prioritization of the call by means of the eMLPP functionality.

OBJECT OF THE INVENTION

The object of the present invention is therefore to provide a method which allows the subscribers of a mobile radio network, whose access class is blocked due to a temporary overload in the network and therefore do not have access to the mobile radio network, to be able to receive calls of high urgency or priority and, conversely, it should be possible to be able to set up a mobile radio link to a non-prioritized mobile radio terminal even in the case of an overload situation, from a prioritized mobile radio terminal. It should be possible to integrate the method into existing mobile radio networks with little expenditure of labor.

SUMMARY OF THE INVENTION

This object is achieved by a method as shown in drawing, which is a block diagram illustrating the basic features of this invention. More particularly, in the method of setting up a mobile radio link in a mobile radio network, particularly in a cellular mobile radio network, in the case of a mobile radio network accessibility or mobile radio network availability, which is restricted temporarily because of overload, between a prioritized first mobile radio terminal and a non-prioritized second mobile radio terminal, non-prioritized mobile radio terminals being blocked at least partially and at least temporarily due to the overload situation, in which the first, prioritized mobile radio terminal sends a call set up attempt, the mobile radio network recognizes a call set up attempt as prioritized call set up attempt and prefers it compared with call set up attempts of other non-prioritized mobile radio terminals and transmits it to the second, non-prioritized mobile radio terminal, the blocking of the second mobile radio terminal is cancelled at least temporarily so that the incoming call can be accepted by the second mobile radio terminal and the mobile radio link is set up that in particular the access block of the second mobile radio terminal is cancelled by the network or that in particular the second radio terminal comprises means to determine that the call setup attempt comes from a prioritized terminal, and ignores his access block at least temporarily.

Mobile radio networks can be, for example, GSM and/or UMTS networks. Furthermore, prioritized subscribers can be, for example, rescue forces such as fire departments, police, but also serving members of public supply facilities and/or of the mobile radio network operator. This can be a natural person and a facility, such as, e.g., a police station or a fire station. Prioritized subscribers, i.e. prioritized terminals of these subscribers, are thus those mobile radio subscribers whose calls have particularly high urgency and are to be preferred compared with other normal mobile radio subscribers. Prioritized calls are call requests of prioritized subscribers, i.e. that the call set up attempt emanates from a prioritized terminal.

If a prioritized subscriber is mentioned in this description, it is technically meant to be a terminal which is classified as prioritized. Conversely, a subscriber is generally understood to be a synonym for its mobile radio terminal in general.

For the mobile radio network to recognize prioritized calls, it must be known, at the latest before the call set up with the non-prioritized subscriber, that this is a prioritized call. This can take place via various possibilities, one possibility being the HLR customer profile. In the case of an incoming call request, the network first sends a message to the mobile radio terminal which is generally called a PAGING message.

The PAGING message can already contain priority information which is added to it by the mobile radio network and with which the calling subscriber can be identified as prioritized subscriber. This priority information can be selected in accordance with the eMLPP method. As an alternative, the calling subscriber can also inform the network of its access class and this information can be used as priority information. Furthermore, another information element which differs from the eMLPP information element can also be added to the PAGING message. As an alternative to the information element, the mobile radio network can also recognize the prioritized call in another way, for example by checking the entry in the HLR customer profile (Home Location Register) which contains subscriber-specific data.

If the mobile radio network has recognized that this is a prioritized call, it must ensure that the PAGING message is not deleted or delayed due to the load situation. The mobile radio network must therefore deal with the prioritized PAGING message in a preferential way. This can be done by using the eMLPP functionality which will not be discussed in greater detail here.

If the called terminal has received the prioritized PAGING message and if the access class of the SIM/USIM card of the terminal of the called subscriber is blocked, there are, in particular, two possibilities of successfully continuing the call set up.

The first possibility is a temporary, i.e. time-limited deactivation of the blocking of the second mobile radio terminal, i.e. the cancellation of the access classes blocking by the network. According to the invention, it is therefore proposed firstly that, for setting up a telecommunication link in a mobile radio network between a prioritized first subscriber and a non-prioritized second subscriber of the mobile radio network, in the case of a mobile radio network accessibility temporarily restricted because of overload, the first prioritized subscriber places an access request for setting up a telecommunication link with the mobile radio network by sending a message, the mobile radio network recognizes the prioritized access request and conveys it preferentially compared with access requests of other subscribers to the second subscriber, the mobile radio terminal of whom can be temporarily blocked for an access to the mobile radio network, and the blocking of the mobile radio terminal of the second subscriber is cancelled at least temporarily so that the incoming call can be accepted by the second subscriber for setting up a telecommunication link.

If it is known to the network that by means of the prioritized PAGING message, a prioritized call is taking place which, due to the fact that the SIM/USIM card of the terminal of the called subscriber is allocated to a blocked class and the latter can therefore not undertake any interaction with the mobile radio network, the call cannot be accepted by the called subscriber in consequence, the network can cancel the access class blocking. The blocking can be cancelled for all classes. This can be easily applied especially in current mobile radio networks since the access class of the called subscriber is not known to them so that the network must enable every class in order to enable the called subscriber to accept the call. The advantage of this method lies in that it can be implemented with minimum expenditure and by using existing terminals in the mobile radio network since it is terminal-independent.

After opening the classes, the mobile radio network would have to service an increased load again for a short time since now all subscribers are again allowed to access the network. This problem can be met by two measures. On the one hand, the load can be restricted due to the fact that all call requests or other network accesses are rejected or ignored, for example by sending electronic short messages or Internet accesses, and exclusively prioritized access requests are accepted and prioritized communication is set up. However, the consequence of this would be that the network loading is reduced by an unnecessarily high amount at least in the cell(s) managing the prioritized call set up in the network since the local network resources are not completely utilized in this case.

A further possibility, which appropriately takes into account the call requests of the subscribers, consists in opening only the access class which is allocated to the SIM/USIM card of the terminal of the subscriber. In this manner, the random closing of the other access classes can still be carried out and the load in the network can be adequately controlled and reduced and, at the same time, the non-prioritized subscriber can be reliably allowed the authorization of receiving the prioritized call of the first subscriber. One possibility of finding out which access class is allocated to the called subscriber can consist, for example, in carrying out a check of the called subscriber in the HLR (Home Location Register) customer profile, which contains subscriber-specific data, on the basis of the dialed mobile radio number. This makes it possible to selectively enable the non-prioritized subscriber without thus increasing the network loading.

The blocking can preferably be cancelled for the duration of the active communication link.

The second possibility for successfully continuing the call set up is the deactivation of the access classes restriction in the terminal. It is therefore proposed that the mobile radio terminal of the called subscriber is configured in such a manner that it recognizes itself that it is receiver of a prioritized call request and at least temporarily ignores its blocking so that the incoming call can be accepted by the second subscriber for setting up a telecommunication link. The prioritized call can be recognized, for example, by the terminal receiving the PAGING message and recognizing its prioritization. In this manner, it is possible to authorize the non-prioritized subscriber selectively for accepting the prioritized call without influencing the network loading or other subscribers.

The blocking can preferably be ignored for the duration of the active communication link.

To implement the two methods, it is appropriate to find out first whether the called subscriber is allocated to a blocked access class. If this is not the case, other measures are redundant, especially the opening of all access classes since this subscriber is allowed to access the mobile radio network at least still for a certain time also in the case of network overloading. Before cancelling the blocking, it can therefore be provided that it is found whether and that the mobile radio terminal of the second subscriber is blocked for the access to the mobile radio network. This finding can take place, for example, by the terminal of the second subscriber not acknowledging the transmission of the message or the mobile radio network determining the access class of the second subscriber in the home location register (HLR) and comparing it with the currently blocked classes.

It should be pointed out that, in the sense of the present invention, a mobile radio network has facilities, such as transmitting and receiving units, communication links, access facilities and control and monitoring facilities including corresponding programs for controlling and monitoring the communication within the network, which carry out the recognizing of prioritized calls, the reception and forwarding of PAGING messages, the adding of priority information elements to such messages and the preferential treatment of prioritized access and call requests, control the blocking and enabling of access classes and carry out the other measures described. In the sense of the invention, it is therefore generally mentioned that the mobile radio network is capable of carrying out the corresponding measures. Naturally, the corresponding components for carrying out the measures are provided in the actual case.

BRIEF DESCRIPTION OF THE DRAWING

The sole FIGURE of the drawing is a block diagram illustrating the invention.

DETAILED DESCRIPTION

The method begins at step S0. We assume an overload situation in which the accessibility or availability of the mobile radio network is temporarily restricted by access class blocking, (step S2. In step S1 whether there is an overload situation is determined. If there is no overload situation, no restriction of network accessibility and availability is made (step S2).

The method of setting up a mobile radio link in a mobile radio network in the case of an overload situation between a prioritized first mobile radio terminal and a nonprioritized second mobile radio terminal begins at step S3. Here, the first mobile radio terminal sends a call set up attempt to get connected to the second nonprioritized mobile radio terminal.

The nonprioritized second mobile radio terminal is allocated to a particular nonprioritized class and the entire class is blocked at least partially and at least temporarily for access to the mobile radio network due to the overload situation, (step S5). However, prioritized calls are not blocked. In step S4 the priority status of the call is checked.

The mobile radio network recognizes the call set up attempt as a prioritized call set up attempt and prefers it compared with call set up attempts of other nonprioritized mobile radio terminals, (step S6) and the mobile radio network transmits it to the second, nonprioritized mobile radio terminal (step S7).

As the second nonprioritized mobile radio terminal is blocked and cannot accept the call, the blocking of the class of the second mobile radio terminal is cancelled at least temporarily by the network (step S8). Then, the second mobile radio terminal accepts the incoming call in (step 9), and the mobile radio link is set up in step S10.

In case of another call set up attempt taking place in step S11 after cancellation of the access class blocking, only prioritized call set up attempts are accepted by the mobile radio network and by nonprioritized mobile radio terminal (step 14). In step S12 whether the other call set up attempt is prioritized is determined. Nonprioritized call set up attempts are blocked, (step S13). The method ends at step S15.

The invention claimed is:

1. A method of setting up a mobile radio link in a mobile radio network in the case of an overload situation in which the accessibility or availability of the mobile radio network is temporarily restricted between a prioritized first mobile radio terminal and a nonprioritized second mobile radio terminal, the method comprising the steps of:

blocking nonprioritized mobile radio terminals allocated to a particular nonprioritized class as well as the entire class at least partially and at least temporarily from access to the mobile radio network due to the overload situation, sending from the first, prioritized mobile radio terminal a call set up attempt, recognizing with the mobile radio network the call set up attempt as a prioritized call set up attempt, preferring it compared with call set up attempts of other nonprioritized mobile radio terminals, and transmitting it to the second nonprioritized mobile radio terminal, canceling the blocking of the second mobile radio terminal at least temporarily by the network, accepting the incoming call with the second mobile radio terminal, and setting up the mobile radio link is set up.

2. The method defined in claim 1, wherein the blocking is cancelled for the duration of the active telecommunication link.

3. The method defined in claim 1, wherein the prioritization of the first mobile radio terminal is recognized by evaluating priority information of the call set up attempt.

4. The method defined in claim 1, further comprising the step of:

ignoring an access block the second mobile radio terminal for the duration of the active mobile radio link.

5. The method defined in claim 1, wherein the message carries priority information by means of which the mobile radio network and/or the second mobile radio terminal recognizes the prioritized call set up attempt.

6. The method defined in claim 1, further comprising the step of:

checking with the mobile radio network the home location register by means of which the prioritization of the first mobile radio terminal is recognized.

* * * * *